United States Patent Office 3,799,754
Patented Mar. 26, 1974

3,799,754
METHOD FOR PRODUCING GLASS PRECURSOR COMPOSITIONS AND GLASS COMPOSITIONS THEREFROM
Ian M. Thomas, Temperance, Mich., assignor to Owens-Illinois, Inc.
No Drawing. Filed Nov. 27, 1972, Ser. No. 309,946
Int. Cl. C03b 5/16; C08h 1/34
U.S. Cl. 65—134                 23 Claims

ABSTRACT OF THE DISCLOSURE

An improved process for preparing inorganic, oxidic, glass precursor compositions corresponding to a glass consisting essentially of silica, boric oxide, lead oxide, and, optionally, alumina or zinc oxide or mixtures of alumina and zinc oxide, wherein the glass has a sintering temperature in the range of about 300° C. to about 600° C. and melts to a uniform glass product at a temperature of less than about 860° C. by a process wherein a clear solution of a further hydrolyzable metallosiloxane is provided and there is incorporated therein lead oxide and, when present, zinc oxide, to form in the clear solution a uniform dispersion of these oxides, after which the system is further hydrolyzed so as to form a uniform gel and the gel is appropriately heated and calcined to produce substantially a carbon-free, inorganic glass precursor which, upon further heating, forms a colorless glass.

THE INVENTION

The present invention is directed to a method for forming inorganic, oxidic, glass precursor compositions and the manufacture of glasses therefrom.

In U.S. Pat. No. 3,640,093, which is hereby incorporated by reference, there is described a process for forming oxidic products, and glasses from these oxidic products, by a process wherein certain silicon alkoxides are combined and reacted with a sufficient quantity of water in the presence of an effective catalytic amount of an inorganic acid hydrolysis catalyst so as to form a clear solution of a soluble, partially hydrolyzed silicon alkoxide, the amount of water used for hydrolysis being insufficient to cause precipitation in said solution upon the subsequent addition of an alkoxide thereto, and then this clear solution is reacted with a metal alkoxide so as to form a clear solution of a soluble, further hydrolyzable metallosiloxane; the latter clear solution can then be combined and reacted with an aqueous solution of a metal salt that decomposes to an oxide and thereby provides a system containing the needed oxides, as precursors, for the glass composition in a homogeneous solution form after which time this solution, in the presence of an effective gelling amount of water, is gelled and the gel dried and heated to obtain an oxidic product therefrom. The preferred metal salts are acetates because other salts, for example, the nitrates, have high decomposition points and represent a potential explosion hazard when employed on a large scale and others also have high decomposition points relative to the acetate.

In preparing oxidic, glass precursor compositions by the use of Si(OR)$_4$ and alkoxides and acetates in the technique disclosed therein, wherein the composition corresponds to a glass consisting essentially of SiO$_2$, B$_2$O$_3$, PbO, and, optionally, AlO$_3$ or ZnO, or mixtures of Al$_2$O$_3$ and ZnO, and wherein the glass has a sintering temperature in the range of about 300° C. to about 600° C. and melts to a uniform glass product at a temperature less than about 860° C., a problem has been observed. The problem also exists in making a glass from the precursor. That is, when manufacturing precursors of the type indicated above, with their low sintering temperatures and low melting temperatures, it has been observed that the precursor which is produced by heating of the gel, as set forth in that patent, is black and it is very difficult and time consuming to produce a non-sintered, non-black, granular or particulate precursor by heating below the sintering temperature of these compositions. If higher temperatures are used, it is found that the glass formed from the precursor is black unless heated for prolonged periods at a temperature well above the melting temperature of the composition. This is unsatisfactory when one considers that the precursor compositions generally correspond to glasses used for passivation purposes, for sealing purposes, or as binders for noble or other metals, like copper, such as in the application, and formation, of thick films for microelectronic purposes. It will be appreciated that the utility of the glasses in these areas is largely predicated on their ability to form films of uniform, homogeneous, high quality glass in a very short period of time. The blackening problem in the precursor and in the glass is indicative of a non-uniform, non-homogeneous low quality composition not well suited for the intended usages. Likewise, the prolonged heating periods, above the melting temperature to eliminate this, detracts from the economy and efficiency of the end use process. What is needed is a process for forming a substantially carbon-free, inorganic oxide, glass precursor which, when used as intended, for example, as a binder for noble, or other metals, like copper, in thick film microelectronic applications, can be easily converted to a homogeneous, uniform, colorless (i.e., non-black) glass in the shortest possible time with the least expenditure of energy.

Since the precursor compositions sinter between about 300° C. and about 600° C., it is likely that sintering occurs at a temperature lower than that needed to burn out acetate residues and this sintering limits the availability of oxygen or air needed for burnout of carbon moieties. It is also likely that in heating the gel to remove acetate residues, a reducing atmosphere tends to form and results in the formation of substantial amounts of free lead, and zinc when present, which requires substantial later additional heating to oxidize them back into the oxide state. Whatever the reason for the problem, it has now been substantially solved and the needed process provided.

Applicant has now devised a method for forming the needed precursors of the composition corresponding to a glass consisting essentially of SiO$_2$, B$_2$O$_3$, PbO, and, optionally, Al$_2$O$_3$ or ZnO, or mixtures of Al$_2$O$_3$ and ZnO, wherein the glass has a sintering temperature in the range of about 300° C. to about 600° C. and melts to a uniform glass product at a temperature less than 860° C. wherein the inorganic, oxidic, glass precursor can be formed as a granular or particulate material which is substantially carbon-free and free of any black coloration and wherein, when this precursor is heated, it is easily and conveniently converted to a substantially colorless glass. For convenience, the term "precursor" is used because in actual use, these inorganic oxidic materials will be heated above their melting temperature to get them to flow into a uniform, unitary shape, e.g., as a thick film on microelectronic applications. The products, however, which are designated precursors, may be considered glasses themselves. The problem is solved and the need is satisfied by eliminating the use of acetates in the process of U.S. Pat. No. 3,640,093, and supplying the needed PbO and, when present ZnO, in the form of particulate lead oxide and zinc oxide. As used herein, lead oxide and zinc oxide include both anhydrous forms and hydrated forms.

Thus, in accordance with one feature of this invention, there is provided a process for preparing an inorganic oxidic, glass precursor composition corresponding to a glass consisting essentially of silica, boric oxide, lead oxide, and, optionally, alumina or zinc oxide, or mixtures of alumina and zinc oxide, wherein the glass has a sintering temperature in the range of about 300° C. to about 600° C. and melts to a uniform glass product at a temperature less than about 860° C., said method comprising the steps of:

(I) combining $Si(OR)_4$ wherein R is an alkyl of 1 to 6 carbon atoms with a sufficient quantity of water and in the presence of an effective catalytic amount of an inorganic acid hydrolysis catalyst so as to form a clear solution of a soluble, partially hydrolyzed silicon alkoxide, wherein the amount of water is insufficient to cause precipitation in said solution upon the addition of boron alkoxide or aluminum alkoxide thereto, (II) reacting said clear solution of a soluble partially hydrolyzed silicon alkoxide with boron alkoxide and, when $Al_2O_3$ is also present, aluminum alkoxide, so as to form a clear solution of a soluble, further hydrolyzable metallosiloxane, (III) adding in any of said steps (I) or (II), or subsequent thereto, lead oxide and, when ZnO is present, zinc oxide, so as to form in said clear solution of a soluble, further hydrolyzable metallosiloxane a uniform dispersion of lead oxide and, when present, zinc oxide, (IV) further hydrolyzing said further hydrolyzable metallosiloxane in the presence of an effective gelling amount of water so as to convert said clear solution of a soluble, further hydrolyzable metallosiloxane containing said dispersed lead oxide and, when present, zinc oxide, into a uniform gel structure, and (V) heating said gel structure for a time and at a temperature sufficient to convert said gel to a substantially carbon-free, inorganic oxide product.

The heating can be done to effect the formation of the substantially carbon-free oxide product at temperatures which are below the sintering temperature of the composition and thereby result in the formation of a particulate or generally granular product. This product may then be employed for its intended use, such as, for example, by being combined with noble or other metals like copper, for purposes of acting as a binder and applied as a thick film on substrates, and then easily and conveniently converted to a colorless, molten glass with the amount of energy being required to obtain this molten glass now being greatly decreased relative to the former use of acetates. Since the precursor composition will consist of glass forming oxides, all that is required is that the precursor then be heated to the appropriate temperature for a sufficient time to convert the precursor into a colorless, thaat is, non-black or black-gray, uniform, homogeneous, molten glass.

According to another feature of this invention, there is provided a process for preparing an inorganic oxide glass precursor composition corresponding to a glass consisting essentially of silica, alumina, boric oxide and lead oxide, and wherein said glass has a sintering temperature in the range of about 300° C. to about 600° C. and melts to a uniform glass product at a temperature less than about 860° C., said method comprising the steps of:

(I) combining $Si(OR)_4$ wherein R is an alkyl of 1 to 6 carbon atoms with a sufficient quantity of water and in the presence of an effective catalytic amount of an inorganic acid hydrolysis catalyst so as to form a clear solution of a soluble, partially hydrolyzed silicon alkoxide, wherein the amount of water is insufficient to cause precipitation in said solution upon the addition of boron alkoxide and aluminum alkoxide thereto, (II) reacting said clear solution of a soluble, partially hydrolyzed silicon alkoxide with aluminum alkoxide so as to form a clear solution of a soluble, further hydrolyzable aluminosiloxane, (III) adding in any of step (I) or (II), or subsequent thereto, lead oxide and boron alkoxide so as to form a clear solution of a soluble, further hydrolyzable aluminoborosiloxane containing a uniform dispersion of lead oxide, (IV) further hydrolyzing said further hydrolyzable aluminoborosiloxane in the presence of an effective gelling amount of water so as to convert said clear solution of a soluble, further hydrolyzable, aluminoborosiloxane containing said dispersed lead oxide into a uniform gel structure, and (V) heating said gel structure for a time and at a temperature sufficient to convert said gel to a substantially carbon-free, inorganic oxide product.

Yet, according to another feature of this invention, there is provided a process for preparing an inorganic oxide, glass precursor composition corresponding to a glass consisting essentially of silica, $B_2O_3$, and PbO, and wherein the glass has a sintering temperature in the range of about 300° C. to 600° C. and melts to a uniform glass product at a temperature less than about 860° C., said method comprising the steps of:

(I) combining $Si(OR)_4$ wherein R is an alkyl of 1 to 6 carbon atoms with a sufficient quantity of water and in the presence of an effective catalytic amount of an inorganic acid hydrolysis catalyst so as to form a clear solution of a soluble, partially hydrolyzed silicon alkoxide, wherein the amount of water is insufficient to cause a precipitation in said solution upon the addition of boron alkoxide thereto, (II) reacting said clear solution of a soluble, partially hydrolyzed silicon alkoxide with boron alkoxide so as to form a clear solution of a soluble, further-hydrolyzable borosiloxane, (III) adding lead oxide in any of step (I) or (II) or subsequent thereto so as to form a clear solution of a soluble, further hydrolyzable borosiloxane containing a uniform dispersion of said lead oxide, (IV) further hydrolyzing said further hydrolyzable borosiloxane with an effective gelling amount of water so as to convert said clear solution of a soluble, further hydrolyzable borosiloxane containing said dispersed lead oxide into a uniform gel structure, and (V) heating said gel structure for a time and at a temperature sufficient to convert said gel to a substantially carbon-free, inorganic oxide product.

As used herein, sintering temperature contemplates that temperature at which particulate glass flows sufficiently, presumably on its surface, to begin to bind adjacent particles together but yet insufficient to form a molten mass. The term "colorless glass" contemplates the formation of a glass having no residual black or blackish-gray coloration and would thus comprehend glasses having a certain degree of coloration such as, for example, light yellow, but which do not include black or blackish-gray coloration. The term "aluminum alkoxide" contemplates compounds of the formula $Al(OR')_3$ wherein R' is an alkyl of 1 to 6 carbon atoms. The term "aluminum alkoxide" also comprehends the inclusion of so-called double metal alkoxides of the formula $MAl_2(OR')_8$ wherein M is an alkaline earth metal such as, for example, magnesium or calcium or mixtures of the compounds of the two formulae set forth. Thus, when small amounts of magnesium or calcium are desired to be incorporated in the glass, they may be added in the form of the double alkoxide. The term "boron alkoxide" contemplates compounds of the formula $B(OR)_3$ wherein R is an alkyl of 1 to 6 carbon atoms. Highly preferred alkoxides are aluminum butoxide, for example, aluminum secondary butoxide and methyl borate.

The inorganic oxidic glass precursor composition will be routinely selected by those skilled in the art and will correspond to glass compositions consisting essentially of silica, $B_2O_3$, lead oxide, and, optionally, $Al_2O_3$ or ZnO, or mixtures of $Al_2O_3$ and ZnO, and wherein said glass has a sintering temperature in the range of about 300° C. to about 600° C. and melts to a uniform glass product at temperatures less than about 860° C. Exemplary compositions include compositions consisting essentially of about 5 to 26 weight percent PbO, 41 to about 62 weight percent ZnO, 12 to about 23 weight percent $SiO_2$, and 11 to about 21 weight percent $B_2O_3$. Others include compositions of about 2 to 7 percent PbO, 12 to 25 percent $B_2O_3$, 55 to 64 percent ZnO, 9 to 18 percent $SiO_2$, and 1 to 5 percent $Al_2O_3$. Other compositions will be routinely selected by those skilled in the art. It will also be appreciated that other metal oxides may be included in small quantities; those other oxides if added, however, will be added as the alkoxide of the metal or as a particulate metal oxide. Especially useful, high quality products are obtained when using compositions in approximate weight percent on a theoretical oxide basis of about 5 to 30 percent $B_2O_3$, about 5 to 30 percent $SiO_2$, and about 40 to 90 percent PbO, and especially compositions in the range wherein the ratio of $B_2O_3$ to $SiO_2$ is about 1:1, for example, a composition consisting essentially of about 13.5 weight percent $B_2O_3$, about 13.5 weight percent $SiO_2$, and 73 weight percent PbO. An especially highly desirable and useful composition which is manufactured in accordance with this invention is a composition consisting essentially of, on a theoretical oxide basis, in approximate weight percent of 40 to 80 percent PbO, 4 to 12 percent $Al_2O_3$, 16 to 18 percent $B_2O_3$, and 10 to 30 percent $SiO_2$. Especially suitable glasses will be in the ranges indicated above, for example, 4–12 percent $Al_2O_3$, and wherein the ratio of $Al_2O_3$ to $B_2O_3$ to $SiO_2$ is about 1 to 1.5 to 2.5. Exemplary of such a highly suitable composition is one consisting essentially of about 65 percent PbO, about 7 percent $Al_2O_3$, about 10.5 percent $B_2O_3$, and about 17.5 percent $SiO_2$.

The hydrolysis of the tetra-alkoxy silane or silicon alkoxide, $Si(OR)_4$, to form a clear solution of a partially hydrolyzed and probably partially condensed silicon alkoxide is advantageously done in the persence of an organic solvent, the solvent being present in an amount sufficient to maintain the partially hydrolyzed silicon alkoxide in solution and also to maintain a solution of the subsequently formed aluminosiloxane, borosiloxane or aluminoborosiloxane composition, as the case may be. Suitable organic solvents will be relatively volatile solvents, for example, organic solvents having boiling points below about 200° C. and, preferably, below about 150° C. $C_1$–$C_5$ alkanols are suitable with $C_1$ to $C_4$ alkanols being highly preferred. Ethanol is most preferred. The amount of solvent will be routinely selected by those skilled in the art but, generally, an amount between about one-half to about an equal volume of $Si(OR)_4$ will be found quite suitable. Additionally, the hydrolysis is effected in the presence of an effective catalytic amount of an inorganic acid hydrolysis catalyst such as, for example, mineral acids, like HCl, and also including the Lewis acids. The amount will be routinely selected by those skilled in the art and quite convenient operation will be obtained at pH's in the range of about 2 or 2.5 to about 5. The amount of water initially employed to effect the formation of the partially hydrloyzed silicon alkoxide should not be of a quantity such as to cause precipitation or gellation upon the subsequent addition of boron alkoxide or aluminum alkoxide, or mixtures thereof, to the clear solution of the soluble, partially hydrolyzed silicon alkoxide. It is desired in this regard to subsequently form a clear solution for a further hydrolyzable metallosiloxane, e.g. borosiloxane, aluminosiloxane, or alumino-borosiloxane, e.g. borosiloxane, aluminosiloxane, or alumino-borosiloxane as the case may be, so as to have the glass forming oxides provided by these metals in the homogeneous relationship provided by the solution. Precipitation, for example on the addition of the aluminum alkoxide, results in non-homogeneity. Usually, the minimum amount of water to effect the desired partial hydrolysis will be about .3 equivalent (mole) of water per equivalent (mole) of silicon alkoxide. When alumina is to be present in the composition, the amount of water employed will generally be between about 3 and about 1.5 equivalents (moles) per equivalent (mole) of silicon alkoxide. Quite suitable results will be obtained using aluminum alkoxide to provide alumina by using approximately 1 equivalent of water per equivalent of silicon alkoxide. When alumina is not to be present in the composition and the composition consists essentially of silica, $B_2O_3$, lead oxide and, optionally, zinc oxide, slightly higher amounts of water may be employed, for example, up to 2 or 3 equivalents of water per equivalent of silicon alkoxide.

As indicated in U.S. Pat. 3,640,093, the metal alkoxide, for example, boron alkoxide or aluminum alkoxide, or both, are then reacted with the clear solution of a soluble, partially hydrolized silicon alkoxide so as to form a clear solution of a soluble, further hydrolyzable metallosiloxane, which metallosiloxane, depending on the composition, may be a borosiloxane, an aluminosiloxane, or an aluminoborosiloxane.

The lead oxide and, when included zinc oxide, can be added to the reaction system in the step for hydrolyzing the silicon alkoxide or in the step wherein the aluminum alkoxide, boron alkoxide, or both, are added to the partially hydrolyzed silicon alkoxide solution to form the further hydrolyzable metallosiloxane, or subsequent to these steps. The important consideration is that the lead oxide and, when present, zinc oxide, be uniformly dispersed in the clear solution of the soluble, further hydrolyzable metallosiloxane, for example, aluminoborosiloxane, prior to gelling that solution so that when gellation occurs, the oxide will be uniformly dispersed in the gel. The oxides employed will be particulate materials, preferably minus about 400 mesh and, most desirably, will have a particle size less than 10 microns. Commercially available powders having a size distribution of about 1 to 5 microns produce excellent results. In manufacturing, for example, a lead aluminoboro-silicate, it will be convenient to first add the aluminum alkoxide to the clear solution of the partially hydrolized silicon alkoxide, forming a further hydrolyzable aluminosiloxane solution, then adding the methyl borate, forming a further hydrolyzable aluminoborosiloxane, followed by the addition of the lead oxide. Other orders as hereinbefore set forth may be employed, with the important consideration being the formation of a clear solution of a soluble, further hydrolyzable metallosiloxane containing a uniform dispersion of lead oxide, and zinc oxide when present.

After a uniform dispersion of the lead oxide and, when present, zinc oxide is formed in the clear solution of the soluble, further hydrolyzable metallosiloxane, the solution is gelled in the presence of an effective gelling amount of water. This may be done by adding an additional quantity of water to further hydrolyze the further hydrolyzable metallosiloxane, resulting in further hydrolysis, condensation and cross-linking, and the production of the gel. The amount of water which is totally employed in the reaction method, including that used in the initial hydrolysis of silicon alkoxide, and which will be found to be effective in forming the gel, is generally an amount theoretically required to react with all of the individual OR groups added as the reactants. For example, for each mole of tetra-alkoxy silane that was used, four moles of total water will be needed to calculate the total amount of water which will be effective in gelation and, likewise, for each mole, for example, of aluminum alkoxide, three moles of water will be required. Slight excesses are usually preferred. The water, except for that which has been used in the step for hydrolyzing the silicon alkoxide, will be conveniently added after all the ingredients have been added into the reaction system, although, if desired, for convenience, a portion of the water may, for example, be added to the metallosiloxane before lead oxide, and zinc oxide when present, are added, provided these oxides are incorporated in that solution in a uniform manner before gelation begins.

After formation of the gel, the gel is heated in air or oxygen to remove free liquid components such as, for example, any excess water which may be present, the solvent used, and alkanol by-product, and then this product is further heated to remove carbonaceous residues which may be present in the form of bound alkanol and unreacted alkoxide groups, notwithstanding the fact that theoretically sufficient water has been added to react with them. Drying of the gel produces a very friable mass and upon heating to remove carbonaceous residues, a particulate or generally granular material is obtained. Thus, for example, the gel may be heated for a sufficient period of time at a temperature of around 100 to 110° C. to dry same and then the temperature gradually raised up to about, for example, 300° C. or at a temperature less than the sintering temperature of the composition involved so as to form a generally granular, carbon-free, oxidic precursor consisting of glass forming oxides. This product may then be converted to a glass such as, for example, glass coating, by applying it either as a binder with other materials, or alone, onto an appropriate substrate and then heating the substrate to a temperature and time sufficient to convert it into a uniform, colorless glass. Darkening may initially result upon heating of the precursor to a glass but this is easily removed by heating to a slightly higher temperature or by heating for a slightly longer time.

While the foregoing describes the present invention with sufficient particularity to enable those skilled in the art to make and use same and includes the best mode contemplated in practicing the invention, several examples follow. These examples further illustrate the present invention.

EXAMPLE 1

An oxidic product, and from this, a colorless glass, of the approximate compoosition 13.5 percent $SiO_2$, 13.5 percent $B_2O_3$, and 73 percent PbO is prepared as follows. About 46.9 grams of distilled ethyl silicate are dissolved in about 33 ml. of ethanol and there are then added about 4 ml. of water (about 1 equivalent of water per equivalent of ethyl silicate) and 2 drops of 1 normal HCl. The solution is then heated to about 60° C. to enhance the rate of hydrolysis and results in the formation of a visually clear solution of a soluble, partially hydrolyzed ethyl silicate. This solution is then cooled to about 30° C. and about 40.2 g. of methyl borate are added, resulting in the formation of a visually clear solution of a soluble, partially hydrolyzed metallo (boro) siloxane. To this clear solution there are then added about 73 grams of particulate PbO of 99.9 percent purity and having a particle size in the range of about 1 to 5 microns. The mixture is then vigorously agitated, in this case by means of a conventional ultrasonic agitating device, so as to form in the clear solution of the soluble, further hydrolyzable borosiloxane a uniform dispersion of the lead oxide. 60 ml. of water are then added to the mixture while continuing agitation and the mixture then allowed to gel. The gel is then broken up and dried in an air oven overnight at about 110° C. so as to remove free liquid components, for example, water and ethanol (both the solvent and by-product) and is then heated to about 300° C. and held there for about two and one-half hours to remove residual carbon moieties, such as, for example, residual alkoxy groups and probably some bound ethanol. A pale yellow, substantially carbon-free, granular, inorganic oxide product is obtained.

A sample of the above product is then heated in a crucible and melts and fuses to a dark glass at about 600 to 650° C. This dark glass becomes clear on further heating to 800° C.

By repeating the above procedure but, in lieu of lead oxide, using lead acetate to provide the needed lead oxide, a clear, colorless glass is not obtained at 800° C. even when heated longer than the material produced by using lead oxide.

EXAMPLE 2

A substantially carbon-free, inorganic oxide product corresponding to a glass composition on a theoretical oxide basis, of about 17.5 weight percent $SiO_2$, 7 weight percent $Al_2O_3$, 10.5 weight percent $B_2O_3$, and 65.0 weight percent PbO, is prepared as follows. Into about 425 ml. of commercially available proprietary ethanol solvent (which contains about 17 grams of water) there are charged 607 grams of distilled ethyl silicate, 35.5 grams of distilled water, and 24 drops of 1 normal nitric acid. The ingredients are stirred and heated to 60° C. to assist in the hydrolysis reaction and results in the formation of a clear solution of a soluble, partially hydrolyzed ethyl silicate. There are then added to the clear solution about 100 ml. of secondary butanol and about 338 grams of aluminum secondary butoxide in 4 increments with stirring so as to maintain a clear solution. The temperature rises to about 65° C., resulting in the formation of a clear solution of a soluble, further hydrolyzable aluminosiloxane. The latter clear solution is then allowed to cool to about 30° C. and about 650 grams of PbO (Fisher L-71) are added with vigorous mechanical stirring, so as to form in the clear solution of the soluble, further hydrolyzable aluminosiloxane a uniform dispersion of lead oxide therein. About 81 grams of water, which is about one-half the water needed to theoretically hydrolyze the charge of methyl borate, are then added with stirring and serve to further hydrolyze the further hydrolyzable aluminosiloxane. There are then added about 313 grams of methyl borate with agitation, thereby forming a clear solution containing an aluminoborosiloxane, having uniformly dispersed therein the lead oxide. About 314 grams of water are then added to further hydrolyze the further hydrolyzable aluminoborosiloxane and after about five minutes, the clear solution containing the uniform dispersion of lead oxide forms a uniform, homogeneous gel. The total charge of water in this reaction is about 447.5 grams or about 24.85 moles which corresponds to the amount of water theoretically required to react with each of the individual alkoxide groups added in the form of ethyl silicate, aluminum butoxide and methyl borate. The firm gel is transferred to a large Teflon tray and heated at about 60° C. for approximately 18 hours. This effects a partial volatilization of some of the liquid components, for example, alkanol byproduct, the solvent, and the secondary butanol added. The product, an extremely friable granular material, is then crushed to an extremely fine particle size, orange-colored powder. The powder is then heated for approximately one and one-quarter hours at 100° C., one and one-quarter hours at 150° C., two hours at 200° C., two hours at 250° C., and about 17 hours at 300° C. so as to remove by heating residual volatiles and carbon moieties which may be present in the form of residual unreacted alkoxide groups or in the form of bound alcohol. A generally yellow-colored, substantially carbon-free, non-sintered, inorganic oxide product results.

This product is then deposited, in about a 5 to 10 mil thickness, onto an alumina substrate, and the coated substrate is then subjected in air to different temperature gradients for a period of approximately one-half hour, the temperature ranging generally from about 585° C. to about 920–950° C. After being heated for about one-half hour, it is observed that a grayish-black glass results up to a temperature of about 660° C.–700° C. and that at temperatures above this point, there results a smooth, glossy, uniform film of colorless glass. It is believed that a substantial cause of the early grayish-black coloration may be the result of elemental lead being present, which lead is oxidized upon further heating at the higher temperatures.

EXAMPLE 3

In a like manner, a non-sintered, substantially carbon-free, inorganic oxide product is produced with the amount of ethyl silicate, aluminum butoxide, methyl borate and lead oxide being selected so as to produce a composition on a theoretical oxide basis corresponding to a glass consisting of about 60 weight percent PbO, 20 weight percent $SiO_2$, 8 weight percent $Al_2O_3$, and 12 weight percent $B_2O_3$. Upon being subjected to the temperature gradients, as set forth in Example 2, it is observed that the powder initially sintered at a temperature less than 600° C. and that up to a temperature of about 620 to 635° C., there is a matty, sintered grayish-black mass. Above this temperature, and up to a temperature of about 740 to 750° C., it is observed that the coating is a glossy, uniform glass having a blackish-gray color. Above the latter temperature, it is observed that the glass is uniform, glossy and colorless.

Substantially similar ease in producing a colorless, i.e., no black or blackish-gray coloration, glass with compositions containing zinc oxide, in addition to lead oxide, results by adding the requisite amount of the zinc oxide, along with the lead oxide as hereinabove indicated.

I claim:

1. A process for preparing an inorganic, oxidic glass precursor composition corresponding to a glass consisting essentially of silica, $B_2O_3$, PbO and, optionally, $Al_2O_3$ or ZnO or mixtures of $Al_2O_3$ and ZnO, wherein said glass has a sintering temperature in the range of about 300° C. to about 600° C. and melts to a uniform glass product at a temperature less than about 860° C., said method comprising the steps of:

(I) combining $Si(OR)_4$ wherein R is an alkyl of 1 to 6 carbon atoms with a sufficient quantity of water and in the presence of an effective catalytic amount of an inorganic acid hydrolysis catalyst so as to form a clear solution of a soluble, partially hydrolyzed silicon alkoxide, wherein the amount of water is insufficient to cause precipitation in said solution upon the addition of boron alkoxide or aluminum alkoxide thereto, (II) reacting said clear solution of a soluble, partially hydrolyzed silicon alkoxide with boron alkoxide and, when $Al_2O_3$ is also present, aluminum alkoxide so as to form a clear solution of a soluble, further hydrolyzable metallosiloxane, (III) adding in any of said step (I) or (II), or subsequent thereto, lead oxide and, when ZnO is present, zinc oxide, so as to form in said clear solution of a soluble, further hydrolyzable metallosiloxane a uniform dispersion of lead oxide and, when present, zinc oxide, (IV) further hydrolyzing said further hydrolyzable metallosiloxane in the presence of an effective gelling amount of water so as to convert said clear solution of a soluble, further hydrolyzable metallosiloxane containing said dispersed lead oxide and, when present, zinc oxide, into a uniform gel structure, and (V) heating said gel structure for a time and at a temperature sufficient to convert said gel to a substantially carbon-free, inorganic oxide product.

2. The method of claim 1 wherein said composition corresponding to a glass having a sintering temperature in the range of about 300° C. to about 600° C. and which melts to a uniform, glass product at a temperature less than about 860° C. consists essentially of, in approximate weight percent, 40 to 80 percent PbO, 4 to 12 percent $Al_2O_3$, 6 to 18 percent $B_2O_3$, and 10 to 30 percent $SiO_2$.

3. The method of claim 2 and further including the step of heating said inorganic oxide composition at a temperature and for a time sufficient for said material to flow into a uniform, colorless glass.

4. The method of claim 2 wherein $Si(OR)_4$ is ethyl silicate, said aluminum alkoxide is aluminum butoxide and said boron alkoxide is methyl borate.

5. The method of claim 2 and wherein the weight percent ratio of $Al_2O_3$ to $B_2O_3$ to $SiO_2$ is about 1 to 1.5 to 2.5.

6. The method of claim 5 wherein said composition consists essentially of about 65 percent PbO, about 7 percent $Al_2O_3$, about 10.5 percent $B_2O_3$, and about 17.5 percent $SiO_2$.

7. The method of claim 1 wherein said composition corresponding to said glass having a sintering temperature in the range of about 300° C. to about 600° C. and which melts to a uniform, glassy product at a temperature less than about 860° C. consists essentially of, in approximate weight percent, 5 to 30 percent $B_2O_3$, 5 to 30 percent $SiO_2$, and 40 to 90 percent PbO.

8. The method of claim 7 and further including the step of heating said inorganic oxide composition at a temperature and for a time sufficient for said material to flow into a uniform, colorless glass.

9. The method of claim 8 wherein the weight percent ratio of $B_2O_3$ to $SiO_2$ is about 1:1.

10. The method of claim 8 wherein said composition in approximate weight percent is 13.5 percent $B_2O_3$, 13.5 percent $SiO_2$, and 73 percent PbO.

11. The process for preparing an inorganic oxide glass precursor composition corresponding to a glass consisting essentially of silica, alumina, boric oxide and lead oxide and wherein said glass has a sintering temperature in the range of about 300° C. to about 600° C. and melts to a uniform glass product at a temperature less than about 860° C., said method comprising the steps of:

(I) combining $Si(OR)_4$ wherein R is an alkyl of 1 to 6 carbon atoms with a sufficient quantity of water and in the presence of an effective catalytic amount of an inorganic acid hydrolysis catalyst so as to form a clear solution of a soluble, partially hydrolyzed silicon alkoxide, wherein the amount of water is insufficient to cause precipitation in said solution upon the addition of boron alkoxide and aluminum alkoxide thereto, (II) reacting said clear solution of a soluble, partially hydrolyzed silicon alkoxide with aluminum alkoxide so as to form a clear solution of a soluble, further hydrolyzable aluminosiloxane, (III) adding in any of step (I) or (II), or subsequent thereto, lead oxide and boron alkoxide, so as to form a clear solution of a soluble, further hydrolyzable aluminoborosiloxane containing a uniform dispersion of lead oxide, (IV) further hydrolyzing said further hydrolyzable aluminosiloxane in the presence of an effective gelling amount of water so as to convert said clear solution of a soluble, further hydrolyzable aluminoborosiloxane containing said dispersed lead oxide into a uniform gel structure, and (V) heating said gel structure for a time and at a time and at a temperature sufficient to convert said gel to a substantially carbon-free, inorganic oxide product.

12. The method of claim 11 wherein the amount of water used in step (I) is between about 0.3 and about 1.5 equivalents of water per equivalent of $Si(OR)_4$, and wherein step I is performed in the presence of a $C_1$ to $C_5$ alcohol.

13. The method of claim 12 wherein the percentages of said oxides are approximately in the range of 40 to 80 weight percent PbO, 4 to 12 weight percent $Al_2O_3$, 6 to 18 weight percent $B_2O_3$ and 10 to 30 weight percent $SiO_2$.

14. The method of claim 13 wherein said composition is approximately 65 weight percent PbO, 7 weight percent $Al_2O_3$, 10.5 weight percent $B_2O_3$, and 17.5 weight percent $SiO_2$.

15. The method of claim 13 wherein alumina is present in the range of about 4 to 12 percent and wherein the weight percent ratio of $Al_2O_3$ to $B_2O_3$ to $SiO_2$ is about 1 to 1.5 to 2.5.

16. The method of claim 15 wherein $Si(OR)_4$ is ethyl silicate.

17. The method of claim 16 wherein said boron alkoxide is methyl borate and wherein said aluminum alkoxide is an aluminum butoxide.

18. The method of claim 13 and further including the step of heating said inorganic oxide material at a temperature and for a time sufficient for said material to flow into a uniform colorless glass.

19. A process for preparing an inorganic oxide glass precursor composition corresponding to a glass consisting essentially of $SiO_2$, $B_2O_3$ and PbO and wherein said glass has a sintering temperature in the range of about 300° C. to about 600° C. and melts to a uniform, glass product at a temperature less than about 860° C., said method comprising the steps of:

(I) combining $Si(OR)_4$ wherein R is an alkyl of 1 to 6 carbon atoms with a sufficient quantity of water and in the presence of an effective catalytic amount of an inorganic acid hydrolysis catalyst so as to form a clear solution of a soluble, partially hydrolyzed silicon alkoxide, wherein the amount of water is insufficient to cause a precipitation in said solution upon the addition of boron alkoxide, (II) reacting said clear solution of a soluble, partially hydrolyzed silicon alkoxide with boron alkoxide so as to form a clear solution of a soluble, further hydrolyzable borosiloxane, (III) adding lead oxide in any of step (I) or (II), or subsequent thereto, so as to form a clear solution of a soluble, further hydrolyzable borosiloxane containing a uniform dispersion of said lead oxide, (IV) further hydrolyzing said further hydrolyzable aluminosiloxane with an effective gelling amount of water so as to convert said clear solution of a soluble, further hydrolyzable borosiloxane containing said dispersed lead oxide into a uniform gel structure, and (V) heating said gel structure for a time and at a temperature sufficient to convert said gel to a substantially carbon-free, inorganic oxide product.

20. The method of claim 19 wherein the approximate weight percent of said oxides in said composition is as follows: 5 to 30 percent $B_2O_3$, 5 to 30 percent $SiO_2$, and 40 to 90 percent PbO.

21. The method of claim 20 wherein said composition is approximately 13.5 percent $B_2O_3$, 13.5 percent $SiO_2$, and 73 percent PbO.

22. The method of claim 20 and further including the step of heating said inorganic oxide at a temperature and for a time sufficient for said material to flow into a uniform colorless glass.

23. The method of claim 22 wherein the amount of water employed in step (I) is about 1 equivalent of water per equivalent of silicon alkoxide, said silicon alkoxide is ethyl silicate and wherein step (I) is performed in the presence of a $C_1$ to $C_5$ alcohol.

References Cited

UNITED STATES PATENTS

| | | | |
|---|---|---|---|
| 3,313,737 | 4/1967 | Brimsmead et al. | 106—38.35 X |
| 3,640,093 | 2/1972 | Levene et al. | 65—134 |
| 3,678,144 | 7/1972 | Shoup | 106—38.35 X |
| 3,690,366 | 9/1972 | Schwartz | 106—38.35 X |

FOREIGN PATENTS 768,455   12/1971   Belgium.

OTHER REFERENCES

Vol. 39, Journal of the American Ceramic Soc., pp. 145–146, by Rustum Roy.

Vol. 52, No. 6, Journal of the American Ceramic Soc., p. 344, by Rustum Roy.

ROBERT L. LINDSAY, JR., Primary Examiner

U.S. Cl. X.R.

106—38.35, 53, 54

UNITED STATES PATENT OFFICE
CERTIFICATE OF CORRECTION

Patent No. 3,799,754    Dated March 26, 1974

Inventor(s)  Ian M. Thomas

It is certified that error appears in the above-identified patent and that said Letters Patent are hereby corrected as shown below:

Column 1, line 67, "AlO$_3$" should be -- Al$_2$O$_3$ --.

Column 3, line 54, "thaat" should be -- that --.

Column 4, line 35, "step" should be -- steps --.

Column 5, line 14, "those" should be -- these --.

Column 5, line 62, "hydrloyzed" should be -- hydrolyzed --.

Column 5, line 68, "for" should be -- of --.

Column 5, lines 70-71, delete "e.g. borosiloxane, aluminosiloxane, or alumino-borosiloxane".

Column 6, line 5, "3" should be -- .3 --.

Column 7, line 41, "compoosition" should be -- composition --

Claim 1, column 9, line 50, "step" should be -- steps --.

Claim 11, column 10, line 47 "step" should be -- steps --.

Claim 11, column 10, line 59 delete "time and at a".

Claim 19, column 11, line 33, "step" should be -- steps --.

Signed and sealed this 17th day of September 1974.

(SEAL)
Attest:

McCOY M. GIBSON JR.
Attesting Officer

C. MARSHALL DANN
Commissioner of Patents